(12) United States Patent
Walker, Jr. et al.

(10) Patent No.: US 8,659,829 B2
(45) Date of Patent: Feb. 25, 2014

(54) MULTILAYER FILM COMPRISING MATTE SURFACE LAYER AND ARTICLES

(75) Inventors: Christopher B. Walker, Jr., St. Paul, MN (US); Michael E. Lauters, Hudson, WI (US); Joan M. Noyola, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/698,297

(22) PCT Filed: Aug. 1, 2011

(86) PCT No.: PCT/US2011/046077
§ 371 (c)(1),
(2), (4) Date: Nov. 16, 2012

(87) PCT Pub. No.: WO2012/018705
PCT Pub. Date: Feb. 9, 2012

(65) Prior Publication Data
US 2013/0135750 A1 May 30, 2013

Related U.S. Application Data

(60) Provisional application No. 61/371,026, filed on Aug. 5, 2010.

(51) Int. Cl.
*G03B 21/60* (2006.01)
(52) U.S. Cl.
USPC ........... 359/452; 359/296; 359/454; 362/317; 313/512
(58) Field of Classification Search
USPC ................. 359/296, 452, 454, 599, 707, 741; 345/105–107; 430/50, 66, 97, 199, 430/291, 531, 538; 428/141, 154, 156, 198, 428/402–404, 614; 362/326
See application file for complete search history.

(56) References Cited

U.S. PATENT DOCUMENTS 2,207,965 A * 7/1940 Alexander ...................... 169/26
RE27,617 E 4/1973 Olsen
(Continued)

FOREIGN PATENT DOCUMENTS

EP 1962111 8/2008
WO WO 00/48037 8/2000
(Continued)

OTHER PUBLICATIONS

Billmeyer et al., "On the Measurement of Haze", Color Research and Application, vol. 10, No. 4, Winter 1985, pp. 219-224.
(Continued)

*Primary Examiner* — Loha Ben
(74) *Attorney, Agent, or Firm* — Carolyn A. Fischer

(57) ABSTRACT

Optical films are described comprising a color shifting film comprising a matte surface layer; and light control microstructured layer disposed proximate the color shifting film. The optical film may comprise a matte layer disposed on a major surface of the color shifting film and the light control micro structured layer disposed on the color shifting film at an interface that is free of adhesive. Alternatively, the optical film may comprise a film stack comprising a light control film having a light control microstructured layer, a color shifting film, and an adhesive layer between the light control film and color shifting film. In some embodiments, the matte layer comprises matte particles. In other embodiments, the matte layer comprises a plurality of microstructures and no greater than 50% of the microstructures comprise embedded matte particles. In some embodiments, the microstructures are substantially free of embedded matte particles.

35 Claims, 4 Drawing Sheets

(56) References Cited

U.S. PATENT DOCUMENTS

| | | | |
|---|---|---|---|
| 4,262,072 A | 4/1981 | Wendling | |
| 4,911,529 A * | 3/1990 | Van De Ven | 359/454 |
| 5,175,030 A | 12/1992 | Lu | |
| 5,183,597 A | 2/1993 | Lu | |
| 6,120,026 A | 9/2000 | Whitney | |
| 6,398,370 B1 | 6/2002 | Chiu | |
| 6,531,230 B1 | 3/2003 | Weber | |
| 6,756,120 B2 * | 6/2004 | Smith et al. | 428/404 |
| 6,803,088 B2 * | 10/2004 | Kaminsky et al. | 428/141 |
| 6,946,196 B2 * | 9/2005 | Foss | 428/373 |
| 6,958,860 B2 * | 10/2005 | Dontula et al. | 359/599 |
| 7,009,771 B2 * | 3/2006 | Bourdelais et al. | 359/599 |
| 7,018,713 B2 | 3/2006 | Padiyath | |
| 7,064,897 B2 | 6/2006 | Hebrink | |
| 7,140,741 B2 | 11/2006 | Fleming | |
| 7,256,936 B2 | 8/2007 | Hebrink | |
| 7,328,638 B2 | 2/2008 | Gardiner | |
| 7,350,442 B2 | 4/2008 | Ehnes | |
| 7,371,329 B2 * | 5/2008 | Edlinger et al. | 210/767 |
| 7,486,019 B2 | 2/2009 | Padiyath | |
| 7,507,467 B2 * | 3/2009 | Edlinger et al. | 428/310.5 |
| 7,709,092 B2 | 5/2010 | Qiu | |
| 7,744,987 B2 | 6/2010 | Hebrink | |
| 8,243,358 B2 * | 8/2012 | Wen et al. | 359/288 |
| 2007/0160811 A1 | 7/2007 | Gaides | |
| 2007/0286994 A1 | 12/2007 | Walker | |
| 2008/0083998 A1 | 4/2008 | Merrill | |
| 2008/0221291 A1 | 9/2008 | Invie | |
| 2009/0086326 A1 | 4/2009 | Hamamoto | |
| 2010/0201242 A1 | 8/2010 | Liu | |

FOREIGN PATENT DOCUMENTS

| | | |
|---|---|---|
| WO | WO 2007/146509 | 12/2007 |
| WO | WO 2009/085581 | 7/2009 |
| WO | WO 2010/141261 | 12/2010 |
| WO | WO 2010/141345 | 12/2010 |
| WO | WO 2011/140018 | 11/2011 |
| WO | WO 2012/074814 | 6/2012 |

OTHER PUBLICATIONS

International Search Report PCT/US2011/046077 Mar. 28, 2012, 3 pgs.

* cited by examiner

MULTILAYER FILM COMPRISING MATTE SURFACE LAYER AND ARTICLES

BACKGROUND

Light control film (LCF), also known as light collimating film, is an optical film that is configured to regulate the directionality of transmitted light. Various LCFs are known, and typically include a light transmissive film having a plurality of parallel grooves wherein the grooves are formed of a light absorbing material. Depending on the orientation of the grooves, the pitch, and the geometry of the grooves (e.g., the side-wall angle), the LCF may provide for maximum transmission at a predetermined angle of incidence with respect to the image plane and provide for image cut-off or black-out along a given polar coordinate (e.g., horizontally in the case of so-called privacy filters, or vertically when such light control films are integrated into instrument panel displays for automobiles).

LCFs may be placed proximate a display surface, image surface, or other surface to be viewed. Typically, LCFs are designed such that at normal incidence, (i.e., 0 degree viewing angle, when a viewer is looking at an image through the LCF in a direction that is perpendicular to the film surface and image plane), the image is viewable. As the viewing angle increases, the amount of light transmitted through the LCF decreases until a viewing cutoff angle is reached where substantially all the light is blocked by the light-absorbing material and the image is no longer viewable. When used as a so-called privacy filter (for instance, for liquid crystal displays in computer monitors or laptop displays), this characteristic of LCFs can provide privacy to a viewer by blocking observation by others that are outside a typical range of viewing angles.

LCFs can be prepared, for instance, by molding and ultraviolet curing a polymerizable resin on a polycarbonate substrate. Such LCFs are commercially available from 3M Company, St. Paul, Minn., under the trade designation "3M™ Filters for Notebook Computers and LCD Monitors".

Color shifting films are multilayered polymeric films, such as described in U.S. Pat. No. 6,531,230.

SUMMARY

In one embodiment, optical films are described comprising a color shifting film comprising a matte surface layer; and light control microstructured layer disposed proximate the color shifting film. The optical film may comprise a matte layer disposed on a major surface of the color shifting film and the light control microstructured layer disposed on the color shifting film at an interface that is free of adhesive. Alternatively, the optical film may comprise a film stack comprising a light control film having a light control microstructured layer, a color shifting film, and an adhesive layer between the light control film and color shifting film. In some embodiments, the matte layer comprises matte particles. In other embodiments, the matte layer comprises a plurality of microstructures and no greater than 50% of the microstructures comprise embedded matte particles. In some embodiments, the microstructures are substantially free of embedded matte particles.

In another embodiment, a multilayer optical film, such as a color shifting film is described comprising a (e.g. microreplicated) matte surface layer comprising a plurality of microstructures having a complement cumulative slope magnitude distribution such that at least 30% have a slope magnitude of at least 0.7 degree and at least 25% have a slope magnitude of less than 1.3 degrees.

In another embodiment, a multilayer optical film, such as a color shifting film is described comprising a microstructured matte layer comprising a plurality of microstructures wherein the matte film has a clarity of no greater than 90%, an average maximum surface height of at least 0.50 micron and no greater than 1.20 microns.

In another embodiment, a multilayer optical film, such as a color shifting film is described comprising a microstructured matte layer comprising a plurality of microstructures wherein the matte film has a clarity of no greater than 90% and the microstructured layer comprises peaks having a mean equivalent diameter of at least 5 microns and no greater than 30 microns.

In some embodiments, the matte layer of the multilayer (e.g. color shifting) film comprises a plurality of microstructures and no greater than 50% of the microstructures comprise embedded matte particles. In other embodiments, the microstructures are substantially free of embedded matte particles.

In some embodiments, the multilayer (e.g. color shifting) film is combined with a light control microstructured layer, such as previously described. In other embodiments, the multilayer (e.g. color shifting) film may be an intermediate or may have a different optical function and lacks a light control microstructured layer disposed upon or proximate the multilayer optical film.

Also described are display device comprising a light-emitting element and a film, as described herein, arranged such that at least some of the image light travels through the optical film.

Also described is a structure comprising a fenestration and a film as described herein.

DETAILED DESCRIPTION

Advances in display technology have resulted in brighter, higher resolution, and more energy efficient displays. The brightness and resolution of a display can be reduced, however, when an LCF is positioned in front of the display (e.g., for security purposes or as a contrast enhancement film). It would be desirable to have a privacy solution that, when used in combination with a display, has a higher light transmission and display resolution. At the same time, display users that value the privacy of their information desire a solution that does not compromise that privacy.

Recent advances to LCF films include modification of the groove structure and geometry to enhance the light transmission through the light control film. There is continuous need, however, to enhance the privacy or field of view of such LCF while keeping transmission high. It would further be desirable to provide a non-informational colorful and vivid look to an electronic device's display area for off-axis viewers rather than the heretofore known "black out" privacy view. The present description fulfills these and other needs, and offers other advantages.

Presently described are optical films comprising a color shifting film wherein the color shifting film comprises a matte surface layer. In one embodiment, a film stack is described combining a light control film (LCF) and a color shifting film proximate to one another and, in some embodiments, adhered together. In another embodiment, a light control microstructured layer is disposed (directly) on a color shifting film. Also described are preferred multilayer (e.g. color shifting) film (e.g. intermediate) comprising a microstructured matte surface layer.

Commonly, privacy filters are composed of a stand alone LCF. The film stack described herein with its combination of LCF and color shifting film proximate to the LCF, each serving a different function, may be seen as a "hybrid" privacy filter. In particular, the hybrid privacy filter combines what can be called the "blacking out" functionality of a conventional louver film (LCF) and the color shifting effect of a multilayer optical film (MOF).

Figure 2A:
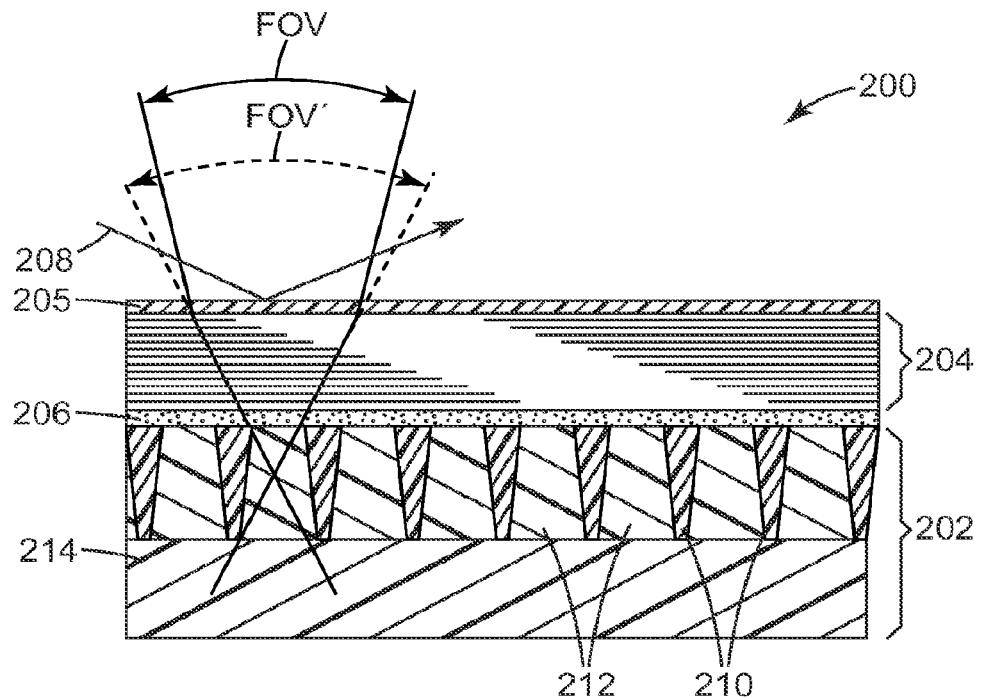
FIGS. 2A and 2B are cross-sectional views of film stacks according to one embodiment of the present description comprising an adhesive layer between a light control film and color shifting film comprising a matte surface layer.
Figure 2B:
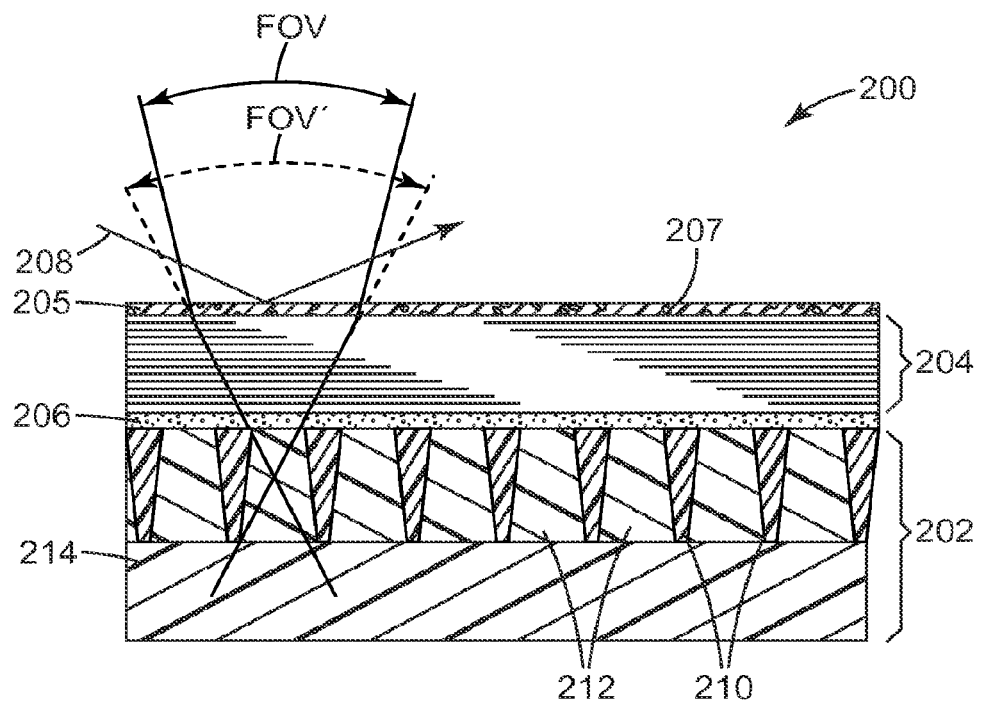
Figure 3A:
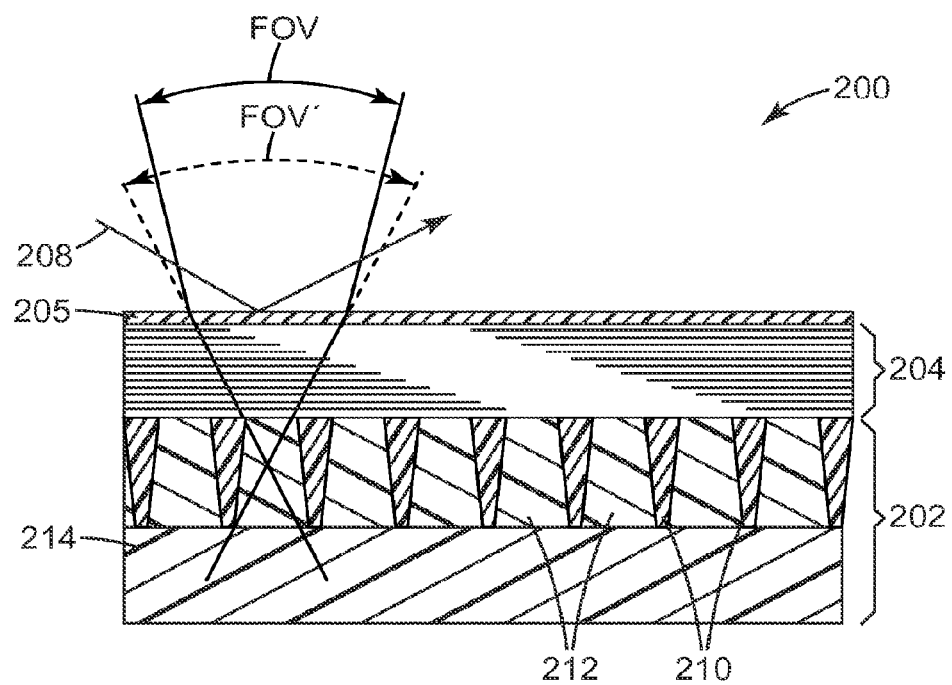
FIGS. 3A and 3B is are cross-sectional views of film stacks according to another embodiment of the present description wherein light control microstructured layer is disposed on a color shifting film comprising a matte surface layer.
Figure 3B:
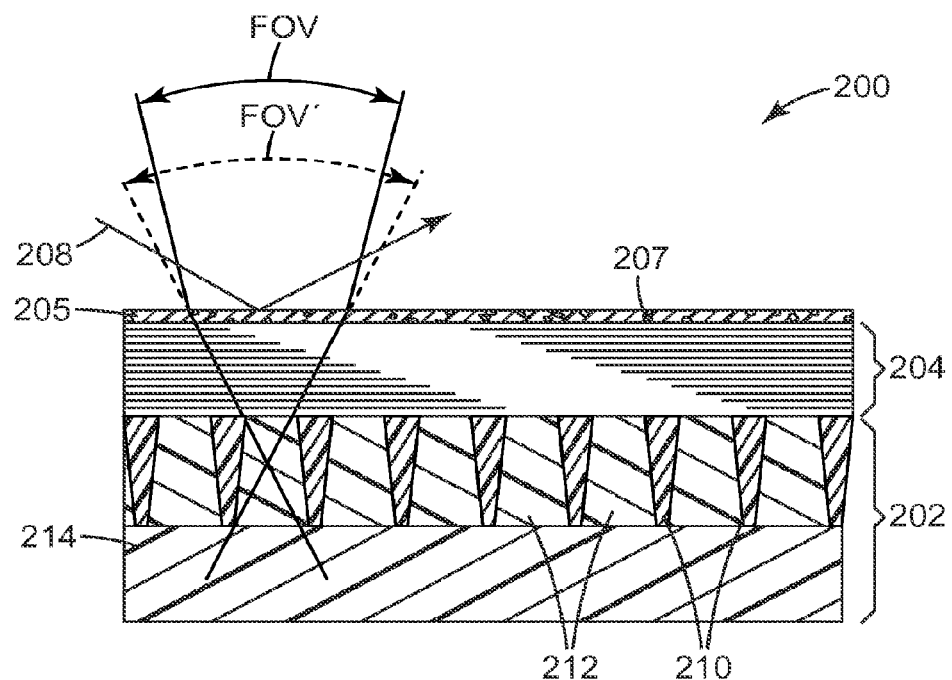

One embodiment of the film stack described herein is illustrated in FIGS. 2A and 2B. The film stack 200, as shown, is composed of an LCF 202 and a color shifting (MOF) film 204 adhered together by an adhesive layer 206. Another embodiment is illustrated in FIGS. 3A and 3B. The optical film stack 202, as shown, is composed of light control microstructured layer 202 disposed on a color shifting film 204. In each of these embodiments, a matte surface layer 205 is disposed on the (exposed) surface of the color shifting film 204.

The light control microstructured layer in FIGS. 2A and 2B and 3A and 3B is composed in part of transmissive regions 212 and non-transmissive regions 210 which alternate across the width of the film. The transmissive and non-transmissive regions in this embodiment are built upon a base substrate 214, which is a further component of the LCF.

FIGS. 2A and 2B and 3A and 3B are useful in showing the reduced cut-off angle, and therefore heightened privacy, created as a result of the film stack (as opposed to an LCF alone), in part due to the ambient light 208 reflection off of the MOF 204.

A hybrid privacy filter utilizing an LCF (e.g., element 202 in FIGS. 2A and 2B) and an MOF (e.g., element 204 in FIGS. 2A and 2B) has a better defined effective viewing angle cut-off and privacy function than either the LCF or MOF alone. At the same time, the hybrid privacy filter still maintains a high level of transmission that is comparable to a stand alone light control film (for instance, axial transmission).

For simplification, it will be discussed herein the effect that certain films or film stacks have on "on-axis" transmission. Those skilled in the art will readily recognize that the desired axis of transmission may be chosen by designing the geometry of the louvers in an LCF. While in many embodiments, for instance, privacy films, on-axis transmission is perpendicular to the surface of the display image plane, it will be readily understood that for applications wherein a viewer is not typically situated perpendicular to the display image plane, a non-normal viewing axis may be desirable.

There is no substantial decrease in on-axis light transmission for a film stack including an MOF and an LCF vis a vis the LCF alone when used as a privacy filter over top of a display. In some embodiments of the present description, an MOF may be designed to be highly transparent with low reflection and low absorption for light incident at angles that are inside the viewing angle of the LCF.

Reflection of ambient light from the MOF may begin to occur at angles close to or even equal to the cut-off angle of the LCF. The combination of the light blocking properties of the LCF in decreasing the image light transmitted through the film stack and the onset of glare reflection from the MOF from ambient light, can serve to provide a well-defined cut-off angle for privacy filters made from film stacks described herein. The combination of the LCF's ability to block transmission of the display light (typically by absorption) and the MOF's ability to create bright reflections inhibit off-axis viewers from viewing the display content.

Figure 1:
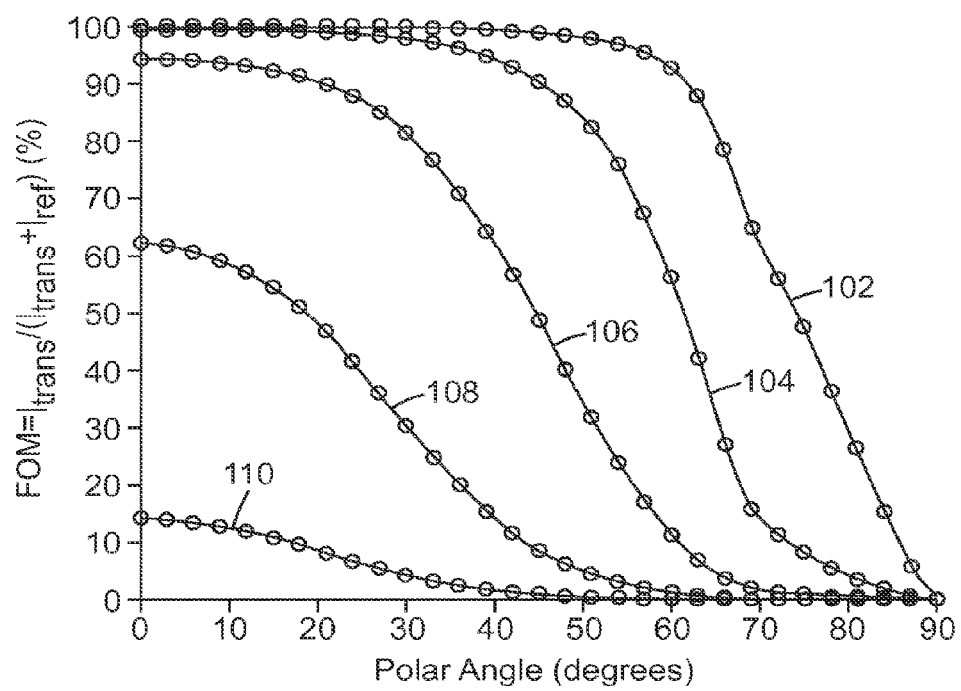
FIG. 1 is a graph displaying Figure of Merit as a function of incident (polar) angle and the ratio of ambient to display intensity for a color shifting film.

FIG. 1 provides a valuable illustration of how a color shifting film (in this instance, an MOF) may be used in the film stack described herein behaves when exposed to various relative levels of ambient light.

In a typical lighting condition such as an office or in an airplane with its cabin's lights on, the ambient light is about the same intensity as the display ($I_{amb} \sim I_{disp}$). When a display is used outdoors, the ambient light is about 10 times the intensity as the display ($I_{amb} \sim 10*I_{disp}$).

At large polar angles an MOF reflects larger amounts of ambient light while transmitting lesser amounts of light. This effect is illustrated in FIG. 1.

FIG. 1 plots "Figure of Merit" for an MOF. Figure of Merit is equivalent to the intensity of transmitted light divided by the sum of the intensity of transmitted light and the intensity of reflected light.

In FIG. 1, Curve 102 represents ambient light that is 1/100 the intensity of a back light (used to approximate the intensity of light from a display). Curve 104 represents ambient light that is 1/10 the intensity of a back light. Curve 106 represents ambient light intensity that is equal to the intensity of a back light. Curve 108 represents ambient light intensity that is ten times that of a back light, and curve 110 is ambient light with an intensity of 100 times that of a back light.

FIG. 1 illustrates that at angles outside the viewing angle of a MOF, the color shifting film can significantly reduce the contrast ratio or viewability of a display by mixing the display signal with the reflected ambient light. In daylight conditions, the privacy function is fairly effective, but it may provide even greater functionality when combined with an LCF, as in the film stacks described herein.

When used as a hybrid privacy filter, the film stacks described herein may employ LCFs having much higher overall transmission, including films that would, on their own, not be effective as privacy filters. For instance, so-called contrast enhancement films, which are LCFs having higher overall transmission of image light and are not as effective at blocking off-axis viewing angles, may be used in combination with an MOF to make a very effective hybrid privacy filter.

Further, in contrast to a conventional privacy filter which turns from clear to black outside the field of view, the hybrid privacy filters described herein turn from clear to red and then golden yellow as ambient light is reflected from the color shifting film at angles outside the field of view, offering an uplifting look that is colorful and vivid, and making it attractive to consumers.

The LCF used in the film stacks of the present application possess a light input surface through which light enters the film, and also a light output surface, through which the light moves towards ultimate transmission (in some embodiments of the present invention, towards and through the color shifting film). The LCF is composed of both transmissive and non-transmissive regions. The transmissive and non-transmissive regions, which alternate in order, are disposed between the light input surface and light output surface.

In some embodiments, LCFs are designed with non-transmissive regions that are absorptive regions. When the non-transmissive regions are absorptive, they may be designed so as to ensure that the absorptive regions absorb as much of the incident light as possible. This includes using an absorptive medium (e.g., carbon black), having a particle size small enough to pack the absorptive region so as to allow enough absorption to minimize light leakage. Highly absorptive regions minimize the amount of light that may leak through these regions, and therefore control the directionality and the privacy function of the LCF.

In other embodiments, it may be desirable to create non-transmissive regions that are non-black in color. Use of a light control film with non-black color absorbing regions in a hybrid privacy filter as described herein, may result in different colors appearing to off-axis viewers (that is, other than the gold and/or red viewable when the non-transmissive regions are black). For example, the use of white louvers in an LCF, may result in blue and gold regions seen by an off-axis viewer.

The LCFs used in the present description may be created by multiple processes. One useful process is skiving, further explained in U.S. Pat. Application Re. 27,617 to Olsen. Another useful process is microreplication. One specific example of microreplication involves the following steps: (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (or substrate layer) and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions, and has a surface energy that allows clean removal of the polymerized material from the master. One or more of the surfaces of the base film (or substrate layer) can optionally be primed or otherwise be treated to promote adhesion of the optical layer to the base.

In embodiments wherein the non-transmissive region is absorptive, it may be desirable to minimize reflections of incident light from a display that is transmitted through the film stack. Such reflections may give rise to so-called ghost images. Such reflections may be minimized by what is known as index-matching the non-transmissive and transmissive regions of the LCF. That is, ensuring that the index of refraction of the absorptive regions relative to the transmissive regions is selected so as to minimize reflections (in particular, to minimize or eliminate total internal reflections, TIR). For instance, in some embodiments, the index of refraction of the absorptive region, $N2$, is selected such that, in relation to the index of refraction of the transmissive region, $N1$, the relationship satisfies: $|N2-N1| \leq 0.005$ As mentioned, the relative refractive indexes of absorptive and transmissive regions may be selected for the LCFs. The selection of index-matched materials may result in a reduction of ghost images produced by reflections within the LCF. One consideration in selection of materials is that when the refractive index of the transmissive region is less than the refractive index of the absorptive region, some of the light incident to the interface between them is refracted into the absorptive region and absorbed (Fresnel relations determine how much is absorbed and reflected as a function of angle of incidence and refractive index difference, with the highest amount of reflection occurring at or near so-called grazing angles). On the other hand, the refractive indexes of the two regions can be essentially matched so that the absorptive region refractive index is slightly higher than (if not equal) to the transmissive region, and reflections are essentially eliminated In other embodiments, the brightness of a display incorporating an LCF can be increased when incident light undergoes TIR from the interface between the non-transmissive and transmissive regions. As mentioned, a drawback to this approach is that it can lead to ghosting. Whether a light ray will undergo TIR or not, can be determined from the incidence angle with the interface, and the difference in refractive index of the materials used in the transmissive and non-transmissive regions. When the refractive index of the non-transmissive region is no greater than the refractive index of the transmissive region, for instance the index of refraction of the transmissive region is greater than the index of refraction of the non-transmissive region by more than about 0.005, TIR may occur. In certain instances, TIR may be desirable. Therefore, in some cases, it may be desirable for the relationship between $N2$, the index of refraction of the absorptive region, and $N1$, the index of refraction of the transmissive region, to be such that $N2-N1$ is less than $-0.005$.

Reflections at the interface between the light transmissive region and the non-transmissive region can be controlled by mismatching the relative index of refraction of the light transmissive material and the index of refraction of the light absorbing material over at least a portion of the spectrum, for example the human visible spectrum. For instance, when $N2$ is greater than $N1$, light in the LCF is reflected, but does not undergo TIR. These reflections may also lead to higher light throughput and ghost images for light passing through the LCF. For instance, when $N2-N1>0.005$, light undergoes such reflections. Thus, for situations where there is index mismatching (i.e., the absolute value of $N2-N1$ is greater than 0.005), reflections (either TIR or Fresnel reflections) occur in the LCF.

The LCFs described herein include a plurality of non-transmissive regions. In some embodiments, the non-transmissive regions can be a plurality of channels, as shown elsewhere in the description. In some cases, the LCF can include a plurality of columns such as shown in FIG. 2b of U.S. Pat. No. 6,398,370 (Chiu et al.). In some cases, the LCF described herein can be combined with a second LCF, as also described in U.S. Pat. No. 6,398,370. In other embodiments, the non-transmissive regions are columns, posts, pyramids, cones and other structures that can add angular-dependent light transmitting or light blocking capabilities to a film.

Light absorbing materials for the non-transmissive regions in LCFs can be any suitable material, such as one that functions to absorb or block light at least in a portion of the visible spectrum. In some embodiments, the light absorbing material can be coated or otherwise provided in grooves or indentations in a light transmissive film to form light absorbing regions.

In further embodiments, light absorbing materials can include a black colorant, such as carbon black. The carbon black may be a particulate carbon black having a particle size less than 10 microns, for example 1 micron or less. The carbon black may, in some embodiments, have a mean particle size of less than 1 micron. In yet further embodiments, the absorbing material, (e.g., carbon black, another pigment or dye, or combinations thereof) can be dispersed in a suitable binder. Light absorbing materials also include particles or other scattering elements that can function to block light from being transmitted through the light absorbing regions.

In some cases, it can also be useful to define an "effective polar viewing angle" which includes light transmitted through the LCF at angles larger than the polar viewing cutoff angle. For example, light that intercepts the non-transmissive regions at angles slightly larger than the internal viewing cutoff angle can "bleed through" the thinnest portions of the non-transmissive region. Further, light traveling normal to the plane of the LCF may scatter and stray outside the effective polar viewing angle. The effective polar viewing angle as used herein is defined as the angle at which the relative brightness ratio decreases to 5% or less. The relative brightness ratio (RBR) is the ratio (expressed as a percentage) of the brightness of a diffuse light source as measured through an LCF to the brightness of the same diffuse light source as measured without the LCF. Preferably, light exits the light output surface with a maximum relative brightness ratio (RBR) in a direction perpendicular to the light output surface of 65 or greater, and exits the light output surface with an effective polar viewing angle (EPV) of 45° or less.

The LCF is composed at least partially of polymerizable resin. The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds.

The LCF may also be partially composed of a base substrate layer (element 214 in FIG. 2). Particularly useful base materials include polyethylene terephthalate (PET) and polycarbonate (PC). Other suitable substrate materials may include polyethylene naphthalate (PEN), polybutylene terephthalate (PBT), polymethyl methacrylate (PMMA), polystyrene (PS), polyetherimide (PEI), polyethylene (PE), polypropylene (PP), low-density polyethylene (LDPE), linear low-density polyethylene (LLDPE), ethylene-octene copolymer (EO), ethylene-styrene copolymer (ES), ethylene-propylene copolymer (EP), ethylene-hexene copolymer (EH), acrylonitrile butadiene styrene (ABS), tetrafluoroethylene-hexafluoropropylene-vinylidene fluoride copolymer (THV), polyurethane (PU), polyvinyl alcohol (PVA), ethylene vinyl acetetate (EVA), ethyelene-co-acrylate acid (EAA), polyamide (PA), polyvinyl chloride (PVC), polydimethylsiloxane (PDMS), poly p-phenylene sulfide (PPS), polyvinylidene fluoride (PVDF), polyether sulfone (PES) and their copolymers and blends, or glass, or other transparent substrate with visible light transmission of 50% or more. Further potentially useful materials are discussed in commonly owned PCT Publication No. WO2009/085581.

When placed in a film stack with the color shifting films, hereafter described, the light output surface of the LCF is placed more proximate the color shifting film than the light input surface. In some embodiments the color shifting film is placed adjacent to the light output surface. In such embodiments, light enters the film stack through the light input surface of the LCF and exits the film stack through the color shifting film.

The color shifting films of the present invention are, in some embodiments, optically anisotropic multilayer polymer films that change color as a function of viewing angle. These films, which may be designed to reflect one or both polarizations of light over at least one bandwidth, can be tailored to exhibit a sharp band edge at one or both sides of at least one reflective bandwidth, thereby giving a high degree of color saturation at acute angles. The films have a large number of layers, the layers being oriented such that there are alternating layers of at least a first and second layer type, and possibly more types.

The layer thicknesses and indices of refraction of the optical stacks within the color shifting films of the present description are controlled to reflect at least one polarization of specific wavelengths of light (at a particular angle of incidence) while being transparent over other wavelengths. Through careful manipulation of these layer thicknesses and indexes of refraction along the various film axes, the films of the present invention may be made to behave as mirrors or polarizers over one or more regions of the spectrum.

In addition to their high reflectivity, the color shifting films of the present description have two non-obvious features that make them ideal for certain types of color displays. First, with particular material choices, the shape (e.g., the bandwidth and reflectivity values) of the optical transmission/reflection spectrum of the multilayer film for p-polarized light can be made to remain essentially unchanged over a wide range of angles of incidence. Because of this feature, a high efficiency mirror film having a narrow reflection band at, for example, 650 nm will appear deep red in reflection at normal incidence, then red, yellow, green, and blue at successively higher angles of incidence. Such behavior is analogous to moving a color dispersed beam of light across a slit in a spectrophotometer. Indeed, the films of the present invention may be used to make a simple spectrophotometer. Secondly, the color shift with angle is typically greater than that of conventional isotropic multilayer films.

Preferably, the color shifting film will have at least one transmission band in the visible region of the spectrum. The maximum transmission of this transmission band will preferably be at least approximately 70%. The transmission band at normal incidence preferably will vary by less than about 25 nm over a surface area of the film of at least 6 $cm^2$.

The movement of variously shaped reflection bands across the spectrum as the angle of incidence is varied is the primary basis for the color change of the film as a function of viewing angle, and may be used advantageously to create a number of interesting articles and effects as are described herein. Many combinations of transmissive and reflective colors are possible.

A variety of polymer materials suitable for use in the present invention have been taught for use in making coextruded multilayer optical films. Particularly useful materials and methods for choosing appropriate materials for the color shifting film of the present invention may be hardening polymers, for example, a repeating monomer unit derived from a methacrylate. A more complete list of potential materials may be found in U.S. Pat. No. 6,531,230 to Weber et al., incorporated herein by reference.

The making of such color shifting films may also be found in the incorporated U.S. Pat. No. 6,531,230 to Weber et al.

Other suitable color shifting films include multilayer films generated by spin coating, blade coating, dip coating, evaporation, sputtering, chemical vapor deposition (CVD), and the like. Exemplary films include both organic and inorganic materials. Such films are described, for instance, in U.S. Pat. Nos. 7,140,741; 7,486,019; and 7,018,713.

The multilayer (e.g. color shifting) films described herein comprise a matte layer on a major surface. In favored embodiments, the matte layer is present on the exposed viewing surface layer of the multilayer (e.g. color shifting) film as depicted in FIGS. 2A and 2B and 3A and 3B.

Figure 5:
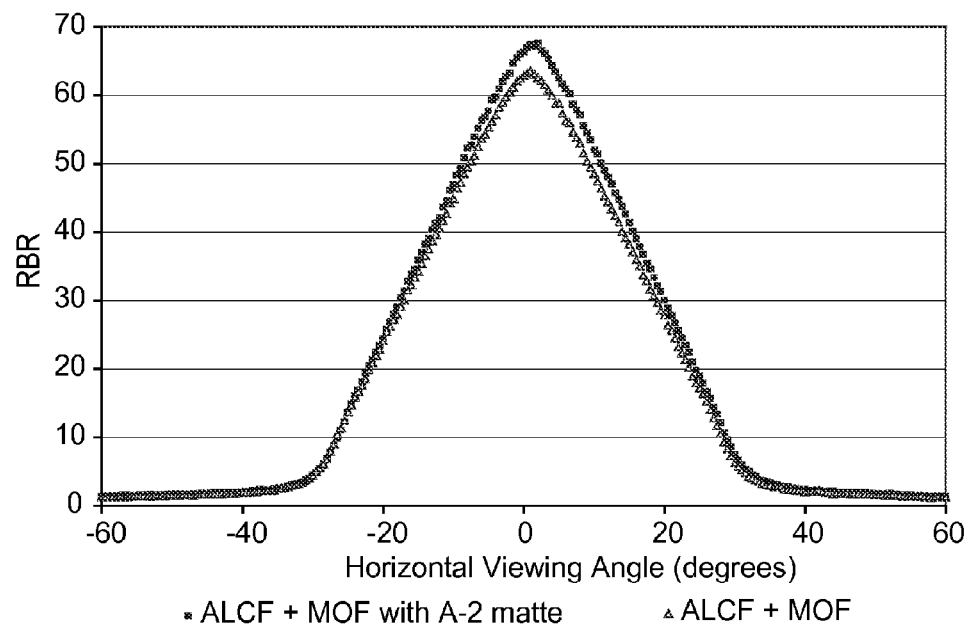

The presence of the matte (e.g. surface) layer to the multilayer (e.g. color shifting) film can advantageously provide a reduction in glare, i.e. antiglare properties. The presence of the matte surface layer can also improve the durability of the film by increasing the pencil hardness or increasing the steel wool durability. In some embodiments, such as depicted in FIG. 5, the inclusion of the matte (e.g. microstructured) layer can improve the on-axis luminance by 1%, 2%, 3%, 4%, or 5%. For embodiments wherein the matte (e.g. microstructured) layer differs in refractive index, the inclusion of the matte layer can reduce the specular reflections.

Matte films (e.g. color shifting) films typically have lower transmission and higher haze values than equivalent gloss films. For examples the haze is generally at least 5%, 6%, 7%, 8%, 9%, or 10% as measured according to ASTM D1003. Further gloss surfaces typically have a gloss of at least 130 as measured according to ASTM D 2457-03 at 60°; whereas matte surfaces have a gloss of less than 120. Further, the multilayer (e.g. color shifting) matte films generally have a transmission of at least 85%, or 90%, and in some embodiments at least 91%, 92%, 93%, or greater.

Matte coatings can be applied to the color shifting film. Matte coatings comprise suitably sized (e.g. inorganic oxide or organic such as polystyrene) particles (207 of FIGS. 2B and 3B) in a coating composition. Matte particles typically have an average size that is greater than about 0.25 micron (250 nanometers), or greater than about 0.5 micron, or greater than about 0.75 micron, or greater than about 1 micron, or greater than about 1.25 microns, or greater than about 1.5 microns, or greater than about 1.75 microns, or greater than about 2 microns. Matte particles typically have an average particle size no greater than 10 microns. The concentration of matte particles may range from at least 1 or 2 wt-% to about 5, 6, 7, 8, 9, or 10 wt-% or greater.

Alternatively, or in addition thereto, the surface can be roughened or textured to provide a matte surface. This can be accomplished in a variety of ways as known in the art including embossing the low refractive index surface together with the underlying layer(s) with a suitable tool that has been bead-blasted or otherwise roughened.

In favored embodiments, multilayer (e.g. color shifting) films are described comprising a microstructured matte surface layer wherein microstructures are generally fabricated using microreplication from a tool by casting and curing a polymerizable resin composition in contact with a tool surface such as described in U.S. Pat. No. 5,175,030 (Lu et al.) and U.S. Pat. No. 5,183,597 (Lu). The tool may be fabricated using any available fabrication method, such as by using engraving or diamond turning. Exemplary diamond turning systems and methods can include and utilize a fast tool servo (FTS) as described in, for example, PCT Published Application No. WO 00/48037, and U.S. Pat. Nos. 7,350,442 and 7,328,638, the disclosures of which are incorporated by reference thereto. Suitable microstructured matte layers and the fabrication thereof are further described in WO2010/141345; incorporated herein by reference.

Durable matte films typically comprise a relatively thick microstructured matte (e.g. viewing) surface layer. The microstructured matte layer typically has an average thickness ("t") of at least 0.5 micron, preferably at least 1 micron, and more preferably at least 2 or 3 microns. The microstructured matte layer typically has a thickness of no greater than 15 microns and more typically no greater than 4 or 5 microns. However, when durability of the matte film is not required, the thickness of the microstructured matte layer can be thinner.

In general, the microstructures of the matte film typically have a height distribution. In some embodiments, the mean height (as measured according to the test method described in the examples) of microstructures is not greater than about 5 microns, or not greater than about 4 microns, or not greater than about 3 microns, or not greater than about 2 microns, or not greater than about 1 micron. The mean height is typically at least 0.1 or 0.2 micron.

In some embodiments, the microstructures are substantially free of (e.g. inorganic oxide or polystyrene) matte particles. However, even in the absence of matte particles, the microstructures typically comprise (e.g. silica) nanoparticles.

The size of the nanoparticles is chosen to avoid significant visible light scattering. It may be desirable to employ a mixture of inorganic oxide particle types to optimize an optical or material property and to lower total composition cost. The surface modified colloidal nanoparticles can be inorganic oxide particles having a (e.g. unassociated) primary particle size or associated particle size of at least 1 nm or 5 nm. The primary or associated particle size is generally less than 100 nm, 75 nm, or 50 nm. Typically the primary or associated particle size is less than 40 nm, 30 nm, or 20 nm. It is preferred that the nanoparticles are unassociated. Their measurements can be based on transmission electron microscopy (TEM). Surface modified colloidal nanoparticles can be substantially fully condensed.

Due to the substantially smaller size of nanoparticles, such nanoparticles do not form a microstructure. Rather, the microstructures comprise a plurality of nanoparticles.

In other embodiments, a portion of the microstructures may comprise embedded matte particles (207 of FIGS. 2B and 3B). Smaller matte particles are typical for matte films that comprise a relatively thin microstructured layer. However, for embodiments wherein the microstructured layer is thicker, the matte particles may have an average size up to 5 microns or 10 microns.

It is surmised that the presence of (e.g. silica or $CaCO_3$) matte particles may provide improved durability even when the presence of such matte particles is insufficient to provide the desired matte (e.g. clarity and haze) properties as will subsequently be described. However, due to the relatively large size of matte particles, it can be difficult to maintain matte particles uniformly dispersed in a coating composition. This can cause variations in the concentration of matte particles applied (particularly in the case of web coating), which in turn causes variations in the matte properties.

For embodiments wherein at least a portion of the microstructures comprise an embedded matte particle or agglomerated matte particle, the average size of the matte particles is typically sufficiently less than the average size of microstructures (e.g. by a factor of about 2 or more) such that the matte particle is surrounded by the polymerizable resin composition of the microstructured layer.

In a favored embodiment, a multilayer (e.g. color shifting) film is described comprising a matte microstructured surface comprising a pluarility of microstructures wherein the microstructured surface has a specified $F_{cc}(\theta)$ complement cumulative slope magnitude distribution. An area ranging from about 200 microns by 250 microns to an area of about 500 microns by 600 microns, can be characterized using atomic force microscopy (AFM), confocal microscopy, or phase shift interferometry according to the test method described in PCT/US2010/036547, filed May 28, 2010; incorporated herein by reference.

The $F_{cc}(\theta)$ complement cumulative slope magnitude distribution is defined by the following equation $$F_{CC}(\theta) = \frac{\sum_{q=\theta}^{\infty} N_G(q)}{\sum_{q=0}^{\infty} N_G(q)}.$$

$F_{cc}$ at a particular angle ($\theta$) is the fraction of the slopes that are greater than or equal to $\theta$.

The optical clarity values can be measured using a Haze-Gard Plus haze meter from BYK-Gardiner. The optical clarity of the polymerized microstructured (hardcoat) matte surface is generally at least about 60% or 65%. In some embodiments, the optical clarity is at least 75% or 80%. In some embodiments, the clarity is no greater than 90%, or 89%, or 88%, or 87%, or 86%, or 85%.

Optical haze is typically defined as the ratio of the transmitted light that deviates from the normal direction by more than 2.5 degrees to the total transmitted light. The optical haze values can also be measured using a Haze-Gard Plus haze meter (available from BYK-Gardiner, Silver Springs, Md.) according to the procedure described in ASTM D1003. The optical haze of the polymerized microstructured (hardcoat) matte surface was less than 20% and preferably less than 15%. In favored embodiments, the optical haze ranges from about 1%, or 2% or 3% to about 10%. In some embodiments the optical haze ranges from about 1%, or 2%, or 3% to about 5%. Hence, the microstructured matte layer are described herein can advantageously provide a haze as low as 1-2%, while still providing antiglare.

In favored embodiments, at least 90% or greater of the microstructures of the microstructured surfaces had a slope magnitude of at least 0.1 degree or greater. Further, at least 75% of the microstructures had a slope magnitude of at least 0.3 degree. Microstructured surfaces, having high clarity and low haze, suitable for use as a front (e.g. viewing) surface matte layer are characterized as having at least 25% or 30% or 35% or 40% and in some embodiments at least 45% or 50% or 55% or 60% or 65% or 70% or 75% of the microstructures having a slope magnitude of at least 0.7 degrees. Thus, at least 25% or 30% or 35% or 40% or 45% or 50% or 55% or 60% or 65% or 70% have a slope magnitude less than 0.7 degree.

Alternatively or in addition thereto, at least 25% of the microstructures had a slope magnitude of less than 1.3 degrees. In some embodiments, at least 30%, or 35%, or 40%, or 45% of the microstructures had a slope magnitude of at least 1.3 degrees. Hence, 55% or 60% or 65% of the microstructures had a slope magnitude less than 1.3 degrees. In other embodiments, at least 5% or 10% or 15% or 20% of the microstructures had a slope magnitude of at least 1.3 degrees. Hence, 80% or 85% or 90% or 95% of the microstructures had a slope magnitude of less than 1.3 degrees.

Alternatively or in addition thereto, in the case of the favored microstructured surfaces, less than 20% or 15% or 10% of the microstructures had a slope magnitude of 4.1 degrees or greater. Thus, 80% or 85% or 90% had a slope magnitude less than 4.1 degrees. In one embodiment, 5% to 10% of the microstructures had a slope magnitude of 4.1 degrees or greater. In other embodiments, less than 5% or 4% or 3% or 2% or 1% of the microstructures had a slope magnitude of 4.1 degrees or greater.

The dimensional characteristics of the microstructured surface can be characterized as described in WO2010/141345.

Such dimensional characteristics have been found to relate to "sparkle", which is a visual degradation of an image displayed through a matte surface due to interaction of the matte surface with the pixels of an LCD. The appearance of sparkle can be described as a plurality of bright spots of a specific color that superimposes "graininess" on an LCD image detracting from the clarity of the transmitted image. The level, or amount, of sparkle depends on the relative size difference between the microreplicated structures and the pixels of the LCD (i.e. the amount of sparkle is display dependent). In general, the microreplicated structures need to be much smaller than LCD pixel size to eliminate sparkle.

The matte microstructured surface comprises a plurality of peak as characterized as described in WO2010/141345.

In favored embodiments, the peaks of the microstructured surface had a mean ECD of at least 5 microns and typically of at least 10 microns. Further, the peaks had a mean ECD (i.e. peak) of less than 30 microns or less than 25 microns. The peaks of the microstructured surface had a mean length of greater than 5 microns and typically greater than 10 microns. The mean width of the peaks of the microstructured surfaces is also at least 5 microns. The peaks of the low sparkle microstructured surfaces had a mean length of no greater than about 20 microns, and in some embodiments no greater than 10 or 15 microns. The ratio of width to length (i.e. W/L) is typically at least 1.0, or 0.9, or 0.8. In some embodiments, the W/L is at least 0.6. In another embodiment, the W/L is less than 0.5 or 0.4 and is typically at least 0.1 or 0.15. The nearest neighbor (i.e. NN) is typically at least 10 or 15 microns and no greater than 100 microns. In some embodiments, the NN ranges from 15 microns to about 20 microns, or 25 microns. Except for the embodiment wherein W/L is less than 0.5 the higher sparkle embodiments typically have a NN of at least about 30 or 40 microns The microstructures typically cover substantially the entire surface. However, without intending to be bound by theory it is believed that the microstructures having slope magnitudes of at least 0.7 degree provide the desired matte properties. Hence, it is surmised that the microstructures having a slope magnitudes of at least 0.7 degree may cover at least about 25%, or at least about 30%, or at least about 35%, or at least about 40%, or at least about 45%, or at least about 50%, or at least about 55%, or at least about 60%, or at least about 65%, or at least about 70%, of the major surface, yet still provide the desired high clarity and low haze.

The plurality of peaks of the microstructured surface can also be characterized with respect to mean height, average roughness (Ra), and average maximum surface height (Rz).

The average surface roughness (i.e. Ra) is typically less than 0.20 micron. Favored embodiments, having high clarity in combination with sufficient haze, exhibit a Ra of less no greater than 0.18 or 0.17 or 0.16 or 0.15 micron. In some embodiments, the Ra is less than 0.14, or 0.13, or 0.12, or 0.11, or 0.10 micron. The Ra is typically at least 0.04 or 0.05 micron.

The average maximum surface height (i.e. Rz) is typically less than 3 microns or less than 2.5 microns. Favored embodiments, having high clarity in combination with sufficient haze, exhibit an Rz of less no greater than 1.20 microns. In some embodiments, the Rz is less than 1.10 or 1.00 or 0.90, or 0.80 microns. The Rz is typically at least 0.40 or 0.50 micron.

The microstructured layer of the matte film typically comprises a polymeric material such as the reaction product of a polymerizable resin. The polymerizable resin preferably comprises surface modified nanoparticles. A variety of free-radically polymerizable monomers, oligomers, polymers, and mixtures thereof can be employed in the polymerizable resin, such as those employed in convention "hardcoat" coating compositions.

Suitable free-radically polymerizable monomers and oligomers including for example (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as ditrimethylolpropane tetraacrylate, dipentaerythritol pentaacrylate, ethoxylated (4) pentaerythritol tetraacrylate, caprolactone modified dipentaerythritol hexaacrylate; (d) oligomeric(meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company of Exton, Pa.; UCB Chemicals Corporation of Smyrna, Ga.; and Aldrich Chemical Company of Milwaukee, Wis.

Preferred crosslinker monomers comprising at least three (meth)acryl groups include for example trimethylolpropane triacrylate (commercially available from Sartomer Company, Exton, Pa. under the trade designation "SR351"), ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494") dipentaerythritol hexaacrylate, and tris(2-hydroxy ethyl)isocyanurate triacrylate (from Sartomer under the trade designation "SR368"). In some aspects, a hydantoin moiety-containing multi-(meth)acrylates compound, such as described in U.S. Pat. No. 4,262,072 (Wendling et al.) is employed.

Silicas for use in the moderate refractive index composition are commercially available from Nalco Chemical Co., Naperville, Ill. under the trade designation "Nalco Collodial Silicas" such as products 1040, 1042, 1050, 1060, 2327 and 2329. Suitable fumed silicas include for example, products commercially available from DeGussa AG, (Hanau, Germany) under the trade designation, "Aerosil series OX-50", as well as product numbers-130, -150, and -200. Fumed silicas are also commercially available from Cabot Corp., Tuscola, Ill., under the trade designations CAB-O-SPERSE 2095", "CAB-O-SPERSE A105", and "CAB-O-SIL M5".

The concentration of (e.g. inorganic) nanoparticles in the microstructured matte layer is typically at least 25 wt-% or 30 wt-%. The moderate refractive index layer typically comprises no greater than 50 wt-% or 40 wt-% inorganic oxide nanoparticles.

The inorganic nanoparticles are preferably treated with a surface treatment agent. Silanes are preferred for silica and other for siliceous fillers.

Silica nanoparticle loaded acrylate hardcoats (nanocomposites) are preferred in view of the abrasion resistance such hardcoat compositions can provide. However, other UV curable coating compositions (epoxies, urethane acrylates) lacking the inclusion of nanoparticles can also be employed.

In one embodiment, the microreplicated layer is prepared from a composition comprising about a 1 to 1.5 ratio of a crosslinking monomer (SR444) comprising at least three (meth)acrylate groups and surface modified silica.

In particular embodiments, in order to create the hybrid privacy filter stack which includes the color shifting film and the light control film, the two layers are proximate to one another. As used herein, "proximate" to one another means that the films are either in contact with one another or, if they are separated, the material interspersed between them does not impart any optical functionality to the film stack.

In some embodiments, the LCF and color shifting film may be adhered together through use of an adhesive (e.g., element 206 in FIGS. 2A and 2B). An adhesive layer may therefore be located between the color shifting film and the light control film.

The adhesive may be partially opaque or optically clear, but will preferably be optically clear (or transparent) so as to not impede light transmission through the film stack.

The adhesive may be cured by any number of suitable methods, such as radiation. One particularly suitable method is curing by ultraviolet radiation.

Appropriate adhesives for use in the present invention may also be pressure-sensitive adhesives. Particularly useful adhesives may include transfer adhesives, or those that are applied by laminating. A useful laminating process is described in commonly owned PCT Publication No. WO2009/085581.

The film stacks described herein are particularly useful as a component of a display device as a so-called hybrid privacy filter. The hybrid privacy filter may be used in conjunction with a display surface, wherein light enters the hybrid privacy filter on the input side of the light control film and exits the hybrid privacy filter or film stack at the color shifting film.

A great number of electronic devices with displays may be used in conjunction with the present invention including laptop monitors, external computer monitors, cell phone displays, televisions, PDAs, smart phones, consoles, or any other similar plasma or LCD based display. Other types of backlit display imaging devices are also contemplated, including non-electronic displays such as sunglasses, document coversheets, windows and any number of others.

In further embodiments, the film stacks described herein may be useful as coverings for glass. For instance, the film stacks may be laminated onto or within fenestrations. The fenestrations may be selected from a glass panel, a window, a door, a wall, and a skylight unit. These fenestrations may be located on the outside of a building or on the interior. They may also be car windows, airplane passenger windows, or the like. Advantages of incorporating these film stacks into fenestrations include reduced IR transmission (which may lead to increased energy savings), ambient light blocking, privacy, and decorative effects.

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification. The foregoing description can be better understood by consideration of the embodiments shown by the testing results and examples that follow.

EXAMPLES

Example 1

A hybrid privacy filter based on a laminate film stack incorporating one type of light control film called Advanced Light Control Film (ALCF), and a multilayer color shifting film was prepared. The light control film was a louver film created by microreplication. The color shifting film had 450 layers and transmission band from 350 nm to 650 nm at normal incident angle. The construction and method of making the color shifting film was described in U.S. Pat. No. 6,531,230 (color shifting film) to Weber et al.

The color shifting film reflected incident light from 650 nm to 1200 nm at normal angle. The light control film was composed of both transmission regions and absorption regions that were disposed on a base substrate. One sheet of color shifting film and one sheet of louver film (as described in commonly owned PCT Publication No. WO2009/085581) were laminated together using a UV curable adhesive (UVX4856 available from Toagosei, Japan) on a laminator. The louver film was built on a 170 μm polycarbonate substrate. The laminate was subsequently UV cured in an oven.

Observation was made to compare the above hybrid with a typical ALCF louver film based privacy filter under an ambient light intensity of 600 lux at the front surface of a color display. The ALCF louver film remained clear inside its designed field of view, then turned from clear to black when viewed outside the field of view. In contrast to conventional privacy filter, the hybrid privacy filter turned from clear to red and then golden yellow as it reflected the ambient light outside the field of view, offering an uplifting look that was colorful and vivid. The privacy function of the two was tested and results are presented in the following Table 1.

TABLE 1

| Angle from Normal, degree | ALCF alone | ALCF + MOF |
|---|---|---|
| 0 | ○ | ○ |
| 5 | ○ | ○ |
| 10 | ○ | ○ |
| 15 | ○ | ○ |
| 20 | ○ | ○ |
| 25 | Δ | Δ |
| 30 | Δ | ■ |
| 35 | ■ | ■ |
| 40 | ■ | X |
| 45 | ■ | X |
| 50 | ■ | X |
| 55 | ■ | X |
| 60 | ■ | X |
| 65 | X | X |

TABLE 1-continued

| Angle from Normal, degree | ALCF alone | ALCF + MOF |
|---|---|---|
| 70 | X | X |
| 75 | X | X |
| 80 | X | X |
| 85 | X | X |
| 90 | X | X |

Visual Privacy Level Inspection
○: Good visibility, no privacy (>50% peak brightness of normal angle)
Δ: Some impeded visibility, some privacy (<20% peak brightness of normal angle)
■: Severely impeded visibility, effective privacy (<5% peak brightness of normal angle)
X: Total invisibility, complete privacy As is clear from this example, the color shifting effect in combination with the light control film enhanced the viewing angle cut-off and privacy function. The effect was exemplified in the difference, illustrated in FIGS. 2A and 2B as FOV' and FOV. This greater privacy occurred while maintaining the same level of high overall transmission. With particular regard to the viewing angle cut-off and privacy function, the hybrid privacy filter of Example 1 reached effective privacy function at an angle of about 5 degrees less than an ALCF alone. In addition, the hybrid filter reached complete privacy (0% visibility of display information) at 35 degree angle whereas the ALCF alone did not achieve the same level of complete privacy until about 60 degrees. This example demonstrated that a hybrid privacy filter comprising an ALCF louver film and a color shifting film has an enhanced privacy function over an ALCF privacy filter alone.

Example 2

The second example included a hybrid privacy filter that was made based on the same lamination process as Example 1, except that the ALCF louver film was replaced by a different louver film called a contrast enhancement film (CEF) which has a wider view angle. This hybrid filter was compared with the stand alone louver film based privacy filter (CEF) for privacy function and color in the same typical ambient light condition as in Example 1. The stand-alone CEF privacy filter remained clear inside of its designed filed of view, and then it turned from transparent to a darkened image (severely impeded, but not total invisibility) when viewed outside its designed field of view. The hybrid privacy filter turned from transparent to red and then golden yellow as it reflects the ambient light outside the field of view. The privacy function was visually inspected at different viewing angles. Comparative results follow in Table 2.

TABLE 2

| Angle from Normal, degree | CEF alone | CEF + MOF |
|---|---|---|
| 0 | ○ | ○ |
| 5 | ○ | ○ |
| 10 | ○ | ○ |
| 15 | ○ | ○ |
| 20 | ○ | ○ |
| 25 | ○ | ○ |
| 30 | ○ | ○ |
| 35 | ○ | Δ |
| 40 | Δ | ■ |
| 45 | Δ | X |
| 50 | ■ | X |
| 55 | ■ | X |
| 60 | ■ | X |
| 65 | ■ | X |
| 70 | ■ | X |

TABLE 2-continued

| Angle from Normal, degree | CEF alone | CEF + MOF |
|---|---|---|
| 75 | ■ | X |
| 80 | ■ | X |
| 85 | ■ | X |
| 90 | ■ | X |

Visual Privacy Level Inspection
○: Good visibility, no privacy (>50% peak brightness of normal angle)
Δ: Some impeded visibility, some privacy (<20% peak brightness of normal angle)
■: Severely impeded visibility, effective privacy (<5% peak brightness of normal angle)
X: Total invisibility, complete privacy As can be noted from the preceding table, under typical lighting condition, the hybrid filter showed enhanced privacy function compared to the stand alone CEF in Example 2. Specifically, the hybrid privacy filter reaches effective privacy function at 10 degrees sooner than stand alone CEF. In addition, hybrid filter reaches complete privacy (0% visibility of display information) at a 45 degree angle, whereas stand alone CEF did not achieve the same level of complete privacy. This example demonstrated that a hybrid privacy filter comprising a CEF louver film and a color shifting film had a narrower field of view and an enhanced privacy function over stand alone CEF privacy filter.

Example 3

A third example made use of another hybrid privacy filter that was based on the same lamination process as in Example 1, except the ALCF louver film was replaced by a different louver film which was made by a skiving process (SLCF). Here the stand alone skived louver filter turned from transparent to darker (and eventually to black) once outside the field of view. The hybrid privacy filters turned from transparent to red and then golden yellow as it reflected ambient light outside the field of view. The privacy function was visually inspected at different viewing angles. Comparative results follow in Table 3.

TABLE 3

| Angle from Normal, degree | SLCF alone | SLCF + MOF |
|---|---|---|
| 0 | ○ | ○ |
| 5 | ○ | ○ |
| 10 | ○ | ○ |
| 15 | ○ | ○ |
| 20 | ○ | ○ |
| 25 | ○ | ○ |
| 30 | Δ | Δ |
| 35 | ■ | X |
| 40 | ■ | X |
| 45 | ■ | X |
| 50 | ■ | X |
| 55 | ■ | X |
| 60 | ■ | X |
| 65 | X | X |
| 70 | X | X |
| 75 | X | X |
| 80 | X | X |
| 85 | X | X |
| 90 | X | X |

Visual Privacy Level Inspection
○: Good visibility, no privacy (>50% peak brightness of normal angle)
Δ: Some impeded visibility, some privacy (<20% peak brightness of normal angle)
■: Severely impeded visibility, effective privacy (<5% peak brightness of normal angle)
X: Total invisibility, complete privacy As can be noted from the preceding table, under typical lighting condition, the hybrid filter showed enhanced privacy function compared to the stand alone skived louver film. Specifically, the hybrid filter reached complete privacy (0% visibility of display information) at a 35 degree angle whereas the stand alone skived louver filter reached the same level of complete privacy at about 65 degrees. This example demonstrated that a hybrid privacy filter comprising a skived louver film and a color shifting film had enhanced privacy function over stand alone skived privacy filter.

A multilayer (e.g. color shifting) film comprising a (e.g. microstructured) matte layer was prepared by microreplication and UV curing of 100% solids coatings, as described in WO2010/141345.

$SiO_2$ surface modified with A174 (39.2 wt-%), as described in WO2007/146509 was mixed with (58.8 wt-%) SR444 (multifunctional acrylate from Sartomer Co) and 2 wt-% photoinitiator (Darocur 4265). When homogeous, the solvent was removed by rotary evaporation at 68° C. (water aspirator), followed by drying with a vacuum pump for 20 minutes 68° C.

Three microstructured matte layers were made by microreplicating the hardcoat composition just described onto the previously described multilayer (e.g. color shifting) film using three different patterned tools resulting in matte films A-1, A-2 and A-3.

Handspread coatings were made using three different rectangular microreplicated tools (4 inches wide and 24 inches long) preheated by placing them on a hot plate at 160° F. A "Catena 35" model laminator from General Binding Corporation (GBC) of Northbrook, Ill., USA was preheated to 160° F. (set at speed 5, laminating pressure at "heavy gauge"). The hardcoats were preheated in an oven at 60° C. and a Fusion Systems UV processor was turned on and warmed up (60 fpm, 100% power, 600 watts/inch D bulb, dichroic reflectors). Samples of the multilayer (e.g. color shifting) film were cut to the length of the tool (~2 feet). The hardcoat was applied to the end of the tool with a plastic disposable pipette, the multilayer (e.g. color shifting) film was placed on top of the bead and tool, and the tool with multilayer (e.g. color shifting) film run through the laminator, thus spreading the coating approximately on the tool such that depressions of the tool were filled with the hardcoat composition. The samples were placed on the UV processor belt and cured via UV polymerization. The resulting cured coatings were approximately 3-6 microns thick.

Since the microstructured surface of the matte layer was a precise replication of the tool surface, the forthcoming description of the microstructured matte layer is also a description of the inverse tool surface.

The $F_{cc}(\theta)$ complement cumulative slope magnitude distribution of the microstructures of the microstructured matte layer is depicted in the following table.

| | $F_{cc}(0.1)$ | $F_{cc}(0.3)$ | $F_{cc}(0.7)$ | $F_{cc}(1.3)$ | $F_{cc}(4.1)$ |
|---|---|---|---|---|---|
| A-1 | 95.9 | 83.5 | 49.1 | 9.3 | 0.0 |
| A-2 | 97.7 | 91.6 | 74.9 | 53.6 | 5.7 |
| A-3 | 98.9 | 94.5 | 76.1 | 38.9 | 0.0 |

Dimensional characteristics of the peaks such as mean equivalent circular diameter, length mean, width mean, width/length mean, nearest neighbor, as determined via the test methods described in WO2010/141345, 2010, were as follows:

|      | ECD mean | Length mean | Width mean | W/L mean | NN    |
|------|----------|-------------|------------|----------|-------|
| A-1  | 30.55    | 41.44       | 24.82      | 0.61     | 40.37 |
| A-2  | 17.68    | 45.98       | 8.54       | 0.28     | 28.85 |
| A-3  | 14.79    | 21.07       | 11.63      | 0.56     | 18.95 |

The plurality of peaks of the microstructured surface characterized with respect to mean height, average roughness (Ra), and average maximum surface height (Rz), according to the test methods described in WO2010/141345, were as follows:

|      | Mean height | Ra    | Rz    |
|------|-------------|-------|-------|
| A-1  | 0.502       | 0.118 | 0.899 |
| A-2  | 0.482       | 0.124 | 1.074 |
| A-3  | 0.349       | 0.097 | 0.657 |

The properties of the matte coated multilayer (e.g. color shifting) films in comparison to the multilayer (e.g. color shifting) film without a matte layer, were as follows:

| Film           | Lambda min | Rmin | Rphot | % T  | % Haze | % Clarity | Pencil Hardness | Steel Wool |
|----------------|------------|------|-------|------|--------|-----------|-----------------|------------|
| A-1            | 525        | 5.66 | 6.49  | 94.3 | 0.72   | 83.4      | 2H              | Pass       |
| A-2            | 586        | 5.28 | 6.38  | 93.5 | 4.6    | 83.1      | H/2H            | Pass       |
| A-3            | 566        | 6.30 | 7.20  | 92.6 | 1.06   | 88.8      | H               |            |
| w/o matte layer| 617        | 7.21 | 8.28  | 92.6 | 0.36   | 100       | HB              | Fail       |

Rubbing the matte coated MOF with steel wool 10 times lightly showed minimal damage (Pass) whereas rubbing SW on MOF resulted in >40 scratches per $in^2$ (Fail). Due primarily to the difference in refractive index between the microreplicated hardcoat and the surface layer of the multilayer (e.g. color shifting) film, the specular reflection (Rphotopic) was also reduced.

Samples of A-1 and A-2 films were laminated to ALCF privacy filters with an adhesive as previously described. This composite is the film referred to in the table and text below as ALCF+MOF with a matte layer. Lamination was performed with both films oriented in the machine direction. For A-2 the long length of the matte topography was perpendicular to the louver direction.

The privacy function was visually inspected at different viewing angles. Comparative results follow in Tables 4 and 5:

TABLE 4

| Angle from Normal, degree | ALCF alone | ALCF + MOF | ALCF + MOF with a matte layer (A-1) |
|---|---|---|---|
| 0  | ○ | ○ | ○ |
| 5  | ○ | ○ | ○ |
| 10 | ○ | ○ | ○ |
| 15 | ○ | ○ | ○ |
| 20 | ○ | ○ | ○ |
| 25 | Δ | Δ | Δ |
| 30 | Δ | ■ | ■ |
| 35 | ■ | ■ | ■ |
| 40 | ■ | X | X |
| 45 | ■ | X | X |
| 50 | ■ | X | X |
| 55 | ■ | X | X |
| 60 | ■ | X | X |
| 65 | X | X | X |
| 70 | X | X | X |
| 75 | X | X | X |
| 80 | X | X | X |
| 85 | X | X | X |
| 90 | X | X | X |

Visual Privacy Level Inspection
○: Good visibility, no privacy (>50% peak brightness of normal angle)
Δ: Some impeded visibility, some privacy (<20% peak brightness of normal angle)
■: Severely impeded visibility, effective privacy (<5% peak brightness of normal angle)
X: Total invisibility, complete privacy

TABLE 5

| Angle from Normal, degree | ALCF alone | ALCF + MOF | ALCF + MOF with a matte layer (A-2) |
|---|---|---|---|
| 0  | ○ | ○ | ○ |
| 5  | ○ | ○ | ○ |
| 10 | ○ | ○ | ○ |
| 15 | ○ | ○ | ○ |
| 20 | ○ | ○ | ○ |
| 25 | Δ | Δ | Δ |
| 30 | Δ | ■ | ■ |
| 35 | ■ | ■ | ■ |
| 40 | ■ | X | ■ |
| 45 | ■ | X | X |
| 50 | ■ | X | X |
| 55 | ■ | X | X |
| 60 | ■ | X | X |
| 65 | X | X | X |
| 70 | X | X | X |
| 75 | X | X | X |
| 80 | X | X | X |
| 85 | X | X | X |
| 90 | X | X | X |

Figure 4:
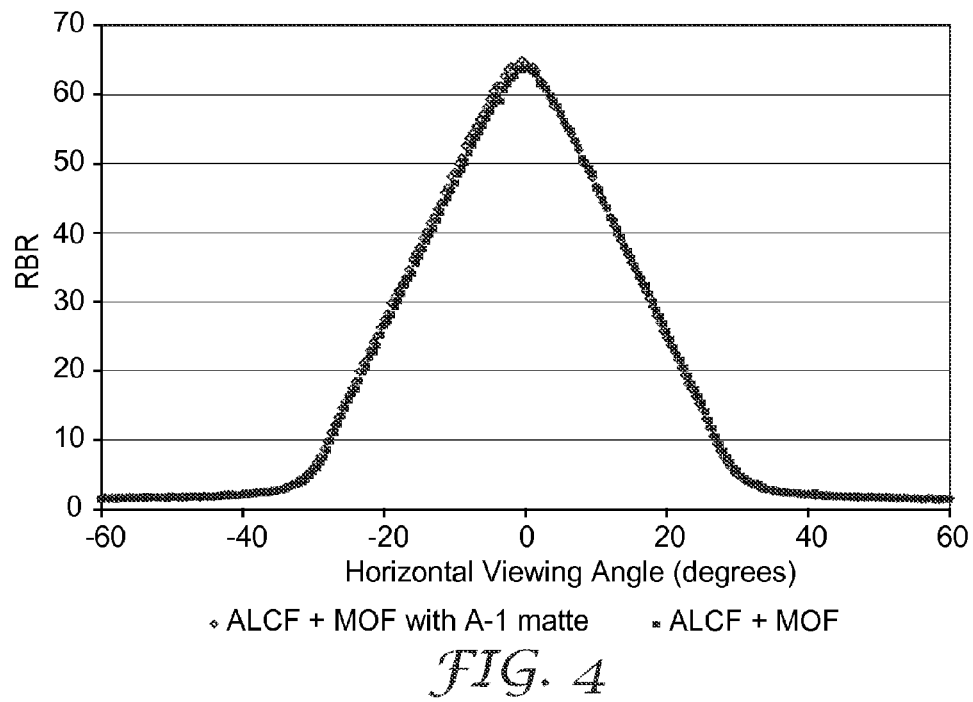
FIGS. 4-5 are graphs of relative brightness ration (RBR) as a function of horizontal viewing angle of embodied optical film stacks, as depicted in FIGS. 2A and 2B.

Visual Privacy Level Inspection
○: Good visibility, no privacy (>50% peak brightness of normal angle)
Δ: Some impeded visibility, some privacy (<20% peak brightness of normal angle)
■: Severely impeded visibility, effective privacy (<5% peak brightness of normal angle)
X: Total invisibility, complete privacy To further demonstrate that the privacy function of the hybrid filter is not compromised by adding the matte layer, the relative brightness ratio RBR of the ALCF+MOF with and without the matte layer A-1 and A-2 was measured using an Eldim 80 Conoscope (Eldim Corp., France). The LCFs were placed on top of a diffusely transmissive hollow light box. The luminance (cd/m2) (brightness) profiles of the light box with the LCFs was measured and the ratio of this value to the value obtained without the LCFs is reported herein as the RBR. The diffuse transmission of the light box can be described as Lambertian. The light box was a six-sided hollow cube measuring approximately 12.5 cm×12.5 cm×11.5 cm (L×W×H) made from diffuse polytetrafluoroethylene (PTFE) plates of ~6 mm thickness. One face of the box was chosen as the sample surface. The hollow light box had a diffuse reflectance of ~0.83 measured at the sample surface (e.g. ~83%, averaged over the 400-700 nm wavelength range. During the RBR testing, the box was illuminated from within through an ~1 cm circular hole in the bottom of the box (opposite the sample surface, with the light directed toward the sample surface from inside). The illumination was provided using a stabilized broadband incandescent light source attached to a fiber-optic bundle used to direct the light (Fostec DCR-II with a 1 cm diameter fiber bundle extension from Schott-Fostec LLC, Marlborough Mass. and Auburn, N.Y.). The results from these measurements are shown in FIGS. 4 and 5.

Reflection of the matte MOF-adhesive-privacy filter was compared to the MOF-adhesive-privacy filter (i.e. without a matte layer) as follows:

| Laminated Material # | Matte Surface | Lambdamin | % Rmin | % Rphotopic |
|---|---|---|---|---|
| Matte hardcoat/ MOF/Adhesive/ privacy filter | A-1 | 582.00 | 7.53 | 9.31 |
| MOF/Adhesive/ Privacy filter | NA | 593.00 | 8.57 | 11.20 |

It is surmised that the addition of the adhesive layer increases the reflection of the matte color shifting film since the adhesive is index mismatched. However, the matte MOF-ALCF optical film stack is lower in reflection than the same stack without the matte coating.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film comprising:
    a color shifting film comprising a matte surface layer wherein the matte surface layer comprises a plurality of microstructures and no greater than 50% of the microstructures comprise embedded matte particles; and
    a light control microstructured layer disposed proximate the color shifting film.

2. The optical film of claim 1, wherein the matte surface layer is disposed on a major surface of the color shifting film and the light control microstructured layer is disposed on the opposing surface of the color shifting film at an interface that is free of adhesive.

3. The optical film of claim 1, wherein the optical film comprises a film stack comprising:
    a light control film having the light control microstructured layer;
    the color shifting film;
    and an adhesive layer between the light control film and color shifting film.

4. The optical film of claim 1, wherein the matte surface layer is an exposed surface layer present on a viewing surface of the color shifting film.

5. The optical film of claim 1, wherein the light control microstructured layer comprises a plurality of transmissive and non-transmissive regions.

6. The optical film of claim 5, wherein the non-transmissive regions comprise carbon black.

7. The optical film of claim 5, wherein the non-transmissive regions comprise a non-black colored material.

8. The optical film of claim 1, wherein the color shifting film comprises multilayer optical film that comprises alternating layers of at least a first and second layer type.

9. The optical film of claim 8, wherein at least one of the alternating layers comprises an inorganic material.

10. The optical film of claim 8, wherein the first layer type comprises a polymeric material.

11. The optical film of claim 1, wherein the color shifting film has at least one transmission band in the visible region of the spectrum with a maximum transmission of at least about 70%.

12. The optical film of claim 1, wherein light incident to the color shifting film exits with a maximum relative brightness ratio (RBR) in a direction perpendicular to the light output surface of 65 or greater, and exits the light output surface with an effective polar viewing angle (EPV) of 45° or less.

13. The optical film of claim 1, wherein the light control microstructured layer comprises a first layer of transmissive and non-transmissive regions and a second layer of transmissive and non-transmissive regions wherein the second layer is orthogonal to the first layer.

14. The optical film of claim 1, wherein the light control microstructured layer comprises a substrate proximate the opposing surface of the color shifting film.

15. The optical film of claim 14, wherein the substrate comprises an adhesive layer for bonding the optical film to a display surface or transparent surface.

16. The optical film of claim 1, wherein the matte surface layer comprises matte particles.

17. The optical film of claim 1, wherein the microstructures are substantially free of embedded matte particles.

18. A display device, comprising:
    a light-emitting element; and
    an optical film according to claim 1 arranged such that at least some of image light travels through the optical film.

19. A display device of claim 18, wherein the display device is selected from a television, a computer monitor, a laptop display, a netbook display, a cell phone, a PDA, and a console.

20. A structure comprising a fenestration and the optical film of claim 1.

21. The structure of claim 20, wherein the fenestration is selected from a glass panel, a window, a door, a wall, and a skylight unit.

22. The structure of claim 21, wherein the fenestration is located on an exterior of a building.

23. A color shifting film comprising a microstructured matte surface layer comprising a plurality of microstructures having a complement cumulative slope magnitude distribution such that at least 30% have a slope magnitude of at least 0.7 degree and at least 25% have a slope magnitude of less than 1.3 degrees; wherein no greater than 50% of the microstructures comprise embedded matte particles.

24. The color shifting film of claim 23, wherein at least 30%, 35% or 40% of the microstructures have a slope magnitude of less than 1.3 degrees.

25. The color shifting film of claim 23, wherein less than 15%, 10% or 5% of the microstructure have a slope magnitude of 4.1 degrees or greater.

26. The color shifting film of claim 23, wherein at least 75% of the microstructures have a slope magnitude of at least 0.3 degree.

27. The color shifting film of claim 23, wherein the matte surface layer comprises peaks having a mean equivalent circular diameter of at least 5 or 10 microns.

28. The color shifting film claim 27, wherein the peaks having a mean equivalent circular diameter of less than 30 or less than 25 microns.

29. The color shifting film of claim 23, wherein the color shifting film has a clarity ranging from about 70% to about 90%.

30. The color shifting film of claim 23, wherein the color shifting film has a haze of no greater than 10%.

31. A color shifting film comprising a microstructured matte layer comprising a plurality of microstructures wherein the matte layer has a clarity of no greater than 90%, an average maximum surface height (Rz) of at least 0.50 micron and no greater than 1.20 microns, and wherein no greater than 50% of the microstructures comprise embedded matte particles.

32. A color shifting film comprising a microstructured matte layer comprising a plurality of microstructures wherein the matte layer has a clarity of no greater than 90% and the microstructured matte layer comprises peaks having a mean equivalent diameter of at least 5 microns and no greater than 30 microns, and no greater than 50% of the microstructures comprise embedded matte particles.

33. A multilayer optical film comprising a microstructured matte surface layer comprising a plurality of microstructures having a complement cumulative slope magnitude distribution such that at least 30% have a slope magnitude of at least 0.7 degree and at least 25% have a slope magnitude of less than 1.3 degrees; wherein no greater than 50% of the microstructures comprise embedded matte particles and the multilayer optical film lacks a light control microstructured layer disposed upon or proximate the multilayer optical film.

34. A multilayer optical film comprising a microstructured matte layer comprising a plurality of microstructures wherein the matte layer has a clarity of no greater than 90%, an average maximum surface height of at least 0.50 micron and no greater than 1.20 microns, wherein no greater than 50% of the microstructures comprise embedded matte particles and the multilayer optical film lacks a light control microstructured layer disposed upon or proximate the multilayer optical film.

35. A multilayer optical film comprising a microstructured matte layer comprising a plurality of microstructures wherein the matte layer has a clarity of no greater than 90% and the microstructured matte layer comprises peaks having a mean equivalent diameter of at least 5 microns and no greater than 30 microns, wherein no greater than 50% of the microstructures comprise embedded matte particles and the multilayer optical film lacks a light control microstructured layer disposed upon or proximate the multilayer optical film.

* * * * *

UNITED STATES PATENT AND TRADEMARK OFFICE
CERTIFICATE OF CORRECTION

PATENT NO.        : 8,659,829 B2
APPLICATION NO.   : 13/698297
DATED             : February 25, 2014
INVENTOR(S)       : Christopher Walker It is certified that error appears in the above-identified patent and that said Letters Patent is hereby corrected as shown below:

In the Specification
Column 2
Line 46, Delete "is are" and insert -- are --, therefor.

Column 5
Line 56, Delete "$|N2-N1|\leq 0.005$" and insert -- $|N2-N1|\leq 0.005$. --, therefor.

Column 6
Line 5-6, Delete "eliminated" and insert -- eliminated. --, therefor.

Column 7
Line 44, Delete "acetetate" and insert -- acetate --, therefor.
Line 44, Delete "ethyelene-co-acrylate" and insert -- ethylene-co-acrylate --, therefor.

Column 10
Line 57, Delete "pluarility" and insert -- plurality --, therefor.

Column 11
Line 41, Delete "0.7 degrees." and insert -- 0.7 degree. --, therefor.

Column 12
Line 32, Delete "microns" and insert -- microns. --, therefor.

Column 13
Line 15, Delete "hydroxypivalaldehyde" and insert -- hydroxypivaldehyde --, therefor.
Line 63, Delete "Collodial" and insert -- Colloidal --, therefor.

Column 16
Line 42, Delete "filed" and insert -- field --, therefor.

Signed and Sealed this
First Day of July, 2014

Michelle K. Lee
*Deputy Director of the United States Patent and Trademark Office*

CERTIFICATE OF CORRECTION (continued)
U.S. Pat. No. 8,659,829 B2

Column 18
Line 17, Delete "homogeous," and insert -- homogeneous, --, therefor.

Column 20
Line 51, Delete "(cd/m2)" and insert -- (cd/m$^2$) --, therefor.

In the Claims
Column 22
Line 62, In Claim 28, after "film" insert -- of --.
Line 63, In Claim 28, delete "having" and insert -- have --, therefor.